(12) United States Patent
Pichereau et al.

(10) Patent No.: US 11,680,157 B2
(45) Date of Patent: Jun. 20, 2023

(54) TIRE COMPOSITIONS AND METHODS FOR MAKING THEREOF

(71) Applicant: Kraton Polymers LLC, Houston, TX (US)

(72) Inventors: Jeremie Pichereau, Almere (NL); Wolfgang Pille-Wolf, Almere (NL); Joshua Guilliams, Akron, OH (US)

(73) Assignee: Kraton Corporation, Houston, TX (US)

( * ) Notice: Subject to any disclaimer, the term of this patent is extended or adjusted under 35 U.S.C. 154(b) by 267 days.

(21) Appl. No.: 16/948,601

(22) Filed: Sep. 24, 2020

(65) Prior Publication Data

US 2021/0002461 A1  Jan. 7, 2021

Related U.S. Application Data

(63) Continuation-in-part of application No. 16/379,614, filed on Apr. 9, 2019, now abandoned.
(Continued)

(51) Int. Cl.
*C08L 9/06* (2006.01)
*C08L 23/22* (2006.01)
(Continued)

(52) U.S. Cl.
CPC .............. *C08L 9/06* (2013.01); *B60C 1/0016* (2013.01); *C08K 3/36* (2013.01); *C08K 5/0016* (2013.01); *C08K 9/04* (2013.01); *C08L 23/22* (2013.01); *C01B 33/18* (2013.01); *C08K 2201/005* (2013.01); *C08K 2201/006* (2013.01); *C08L 25/06* (2013.01); *C08L 47/00* (2013.01); *C08L 93/04* (2013.01); *C08L 2205/03* (2013.01)

(58) Field of Classification Search
CPC .......... C08L 9/06; C08L 25/06; B60C 1/0016; C08K 3/36; C08K 5/0016; C08K 9/04; C08K 2201/005; C08K 2201/006
See application file for complete search history.

(56) References Cited

U.S. PATENT DOCUMENTS

| 5,112,882 A | 5/1992 | Babu et al. |
| 5,856,379 A | 1/1999 | Kentaro et al. |

(Continued)

FOREIGN PATENT DOCUMENTS

| DE | 2813296 A1 | 10/1978 |
| EP | 3205514 A1 | 8/2017 |
| WO | 2016025365 A1 | 2/2016 |

OTHER PUBLICATIONS

"Particulate Matter", Aug. 26, 2020, 1-6.
(Continued)

*Primary Examiner* — Alexander C Kollias
(74) *Attorney, Agent, or Firm* — Beth Haslam

(57) ABSTRACT

A tire composition is disclosed. The composition comprises a rubber component and based on 100 parts by weight (phr) of the rubber component, 50-200 phr of covered silica, with the covered silica comprising silica core and a first resin covering the silica core, wherein the first resin is not chemically bonded to the silica core. The silica core is covered with the first resin by mixing a slurry comprising silica core with a mixture containing the first resin as a solution, an aqueous dispersion; or a solution by dissolving the first resin in a solvent.

20 Claims, 5 Drawing Sheets

Related U.S. Application Data

(60) Provisional application No. 62/655,554, filed on Apr. 10, 2018.

(51) Int. Cl.
| | | |
|---|---|---|
| *C08K 5/00* | (2006.01) | |
| *B60C 1/00* | (2006.01) | |
| *C08K 3/36* | (2006.01) | |
| *C08K 9/04* | (2006.01) | |
| *C01B 33/18* | (2006.01) | |
| *C08L 25/06* | (2006.01) | |
| *C08L 93/04* | (2006.01) | |
| *C08L 47/00* | (2006.01) | |

(56) References Cited

U.S. PATENT DOCUMENTS

| | | | |
|---|---|---|---|
| 9,416,259 B2 | 8/2016 | Olivier et al. | |
| 2004/0127617 A1* | 7/2004 | Vasseur | C08K 5/103 |
| | | | 524/571 |
| 2010/0120950 A1 | 5/2010 | Saiki et al. | |
| 2011/0136962 A1* | 6/2011 | Hattori | C08K 3/36 |
| | | | 524/493 |
| 2012/0157568 A1 | 6/2012 | Sandstrom et al. | |
| 2014/0155521 A1 | 6/2014 | Tatsuya | |
| 2014/0228493 A1* | 8/2014 | Wallen | C08K 9/08 |
| | | | 34/523 |
| 2014/0243448 A1 | 8/2014 | Pierre et al. | |
| 2014/0296373 A1 | 10/2014 | Mabuchi et al. | |
| 2017/0066898 A1* | 3/2017 | Harris | C08K 3/36 |
| 2019/0308451 A1 | 10/2019 | Pichereau et al. | |
| 2021/0139677 A1* | 5/2021 | Pichereau | C08K 3/36 |

OTHER PUBLICATIONS

"ULTRASIL VN 3 GR Product Information", Mar. 2012, 1-2.
Gilles, et al., "The Logic of Agglomeration", Aug. 26, 2020, 1-8.
Sperling, "Introduction to Physical Polymer Science", 1992, 6-7.

\* cited by examiner

TIRE COMPOSITIONS AND METHODS FOR MAKING THEREOF

RELATED APPLICATIONS

This application is a continuation-in-part of U.S. patent application Ser. No. 16/379,614 with a filing date of Apr. 9, 2019, which claims priority from U.S. Application No. 62/655,554, with a filing date of Apr. 10, 2018, the disclosures are incorporated herein by reference.

FIELD

The disclosure relates to compositions for use in tire applications.

BACKGROUND

Treads of high-performance tires are expected to have outstanding traction and handling properties, wet skid resistance, low rolling resistance, good winter performance and good wear characteristics. These properties depend, to a great extent, on the dynamic visco-elasticity properties of the rubber compositions used in making the tires and suitable balance between these properties has to be found through careful design of the rubber composition of the tread.

To change the rubber composition visco-elastic properties, use of solid resins is well known. Despite the availability of liquid resins (which have demonstrated improvement of tire properties balance), solid resins are being extensively used to change the rubber composition's visco-elastic properties. Difficulties in handling liquid resins and cost associated with having to inject a liquid component into the rubber composition may be some of the reasons for non-use of liquid resins.

Rubber compositions have components such as a diene-based elastomer, which could be reinforced with a different type of filler such as carbon black (CB) or precipitated silica. When silica is added to the rubber composition, it becomes difficult to disperse the silica inside the elastomer matrices. The difficulty in dispersing silica within the elastomer matrix arises because his hydrophilic surface (silica exhibits strong silica-silica interaction). To promote the silica-elastomer interaction as well as to reduce the silica-silica interaction, it is well known to those skilled in the art that a so-called silica coupling agent could be used. However, use of the silica coupling agent leads to substantial cost increase.

There is a need for improved methods for making rubber compositions for making tires, and improved resin compositions enabling fine particle silica to disperse uniformly throughout rubber compositions for making tire treads.

SUMMARY

In one aspect, a tire composition is disclosed. The composition comprises a blend of a rubber component and based on 100 parts by weight (phr) of the rubber component; from 50 phr to 200 phr of covered silica, wherein the covered silica comprises silica core and a first resin covering the silica core. The first resin is selected from: a resin being liquid at room temperature, hard resin dispersions and emulsions in water, and a hard resin in an organic solvent.

In embodiments, the resin-covered silica has an average primary particle size of <1000 μm, and the resin-covered silica is formed in a process consisting essentially of coating finely divided silica with a composition consisting essentially of a first resin to coat at least a surface of the finely divided silica forming the resin-covered silica as separate silica particles coated with the first resin.

In another aspect, a method to prepare a tire composition is disclosed. The method comprises mixing with a rubber component and based on 100 parts by weight (phr) of the rubber component; from 50 phr to 200 phr of covered silica, wherein the covered silica comprises silica core and a first resin covering the silica core.

In yet another aspect, a resin-coated silica composition is disclosed. The composition comprises a particulate material; and a resin selected from a rosin-based resin, a terpene-based resin, a C5-C9 resin, a hydrogenated resin, a polymerization-modified rosin resin, a styrenated terpene resin, a polyterpene resin, a phenolic terpene resin, an α-methyl styrene monomer resin, an α-methyl styrene phenolic resin, and combinations thereof; wherein the resin is pre-coated onto a surface of the particulate material.

In embodiments, the resin-coated silica is formed by coating silica particulate with the resin. The resin is not chemically bonded to the particulate material. The particulate material is selected from the group consisting of untreated silica, precipitated silica, crystalline silica, colloidal silica, aluminum silicates, calcium silicates, fumed silica, and mixtures thereof.

In embodiments, the resin is coated onto the surface of the silica particulate by providing a slurry mixture comprising the resin in any of a solution, an aqueous dispersion, or a solution by dissolving the resin in a solvent; mixing the plurality of silica particulates with the slurry mixture for the resin to coat the surface of the silica particulates; and drying the mixture to recover the resin-coated particulate material.

DESCRIPTION

Figure 1:
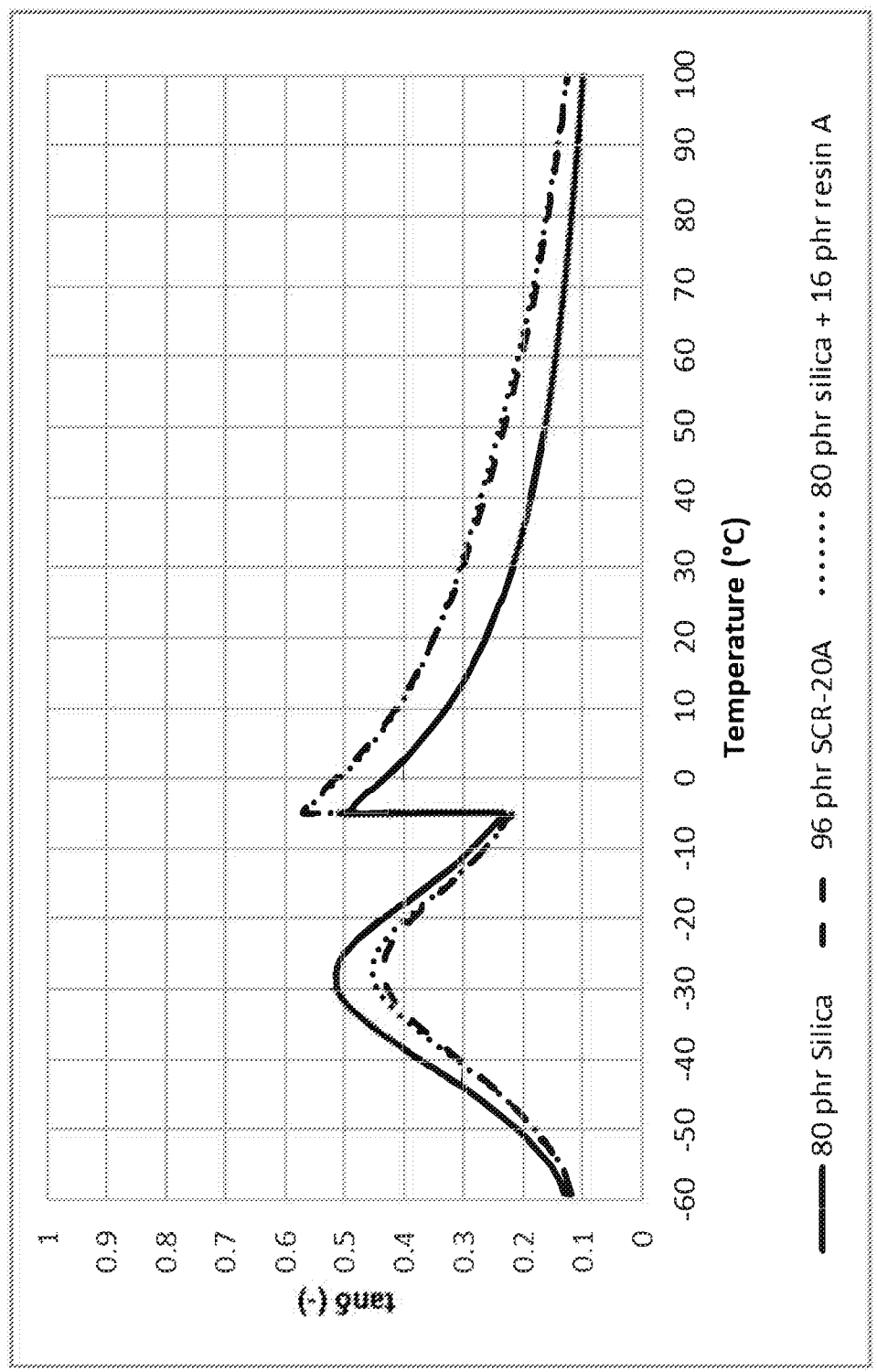
FIG. 1 is a graph illustrating tangent delta vs. temperature performance of the formulation of Examples 1, 3 and 7.
Figure 2:
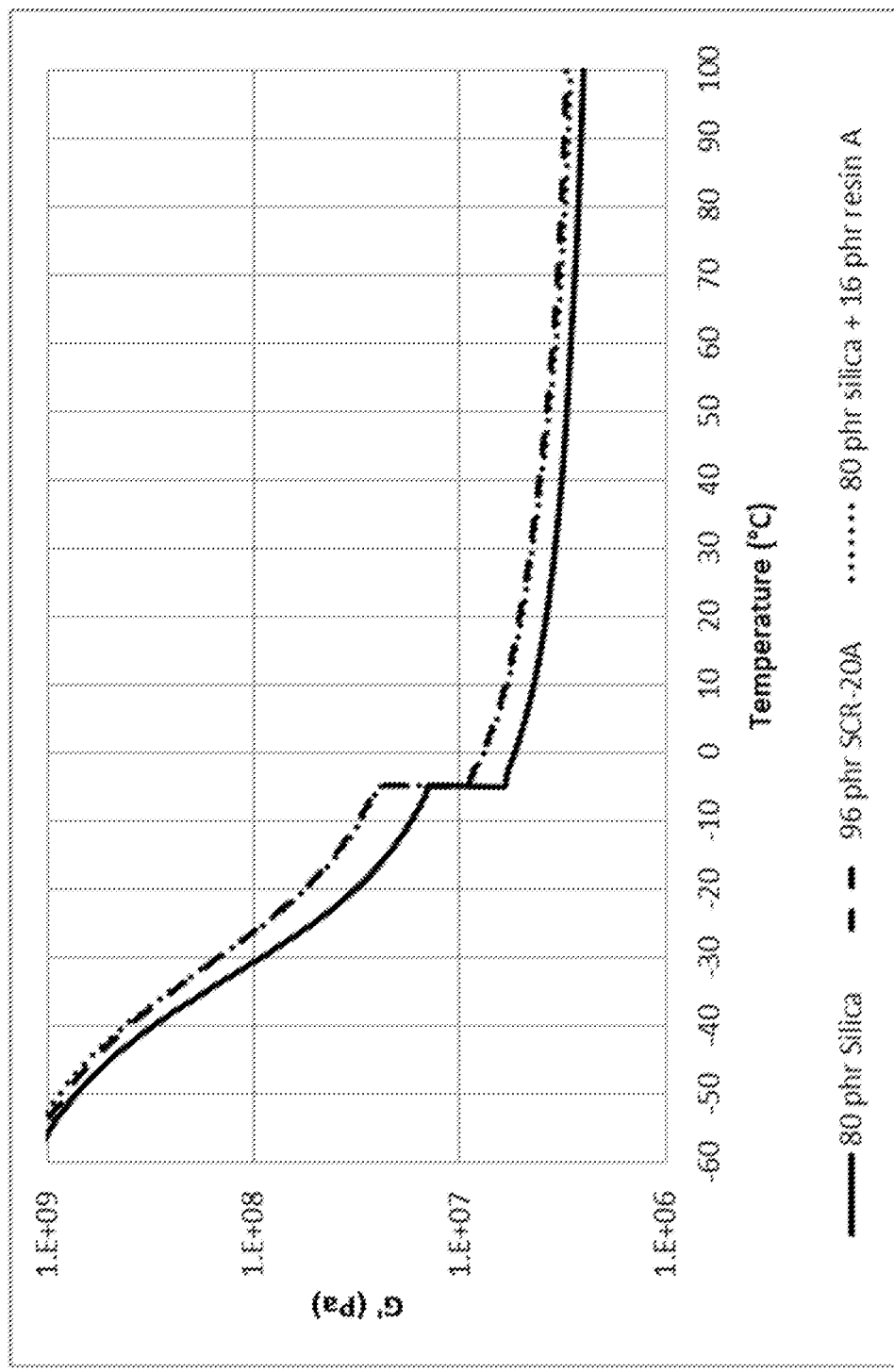
FIG. 2 is a graph illustrating loss modulus vs. temperature performance of the formulation of Examples 1, 3 and 7.

The following terms will be used throughout the specification and will have the following meanings unless otherwise indicated.

"phr" means parts per hundred parts of elastomer (rubber).

"Elastomer" may be used interchangeably with the term "rubber," referring to any polymer or combination of polymers consistent with ASTM D1566 definition.

"Polymer" and "interpolymer" are used interchangeably to mean higher oligomers having a number average molecular weight (Mn) equal to or greater than 100, prepared by the polymerization or oligomerization of at least two different monomers, including copolymers, terpolymers, tetrapolymers, etc.

$M_w$ means the molecular weight average distribution calculated according to:

$$M_w = \frac{\sum_i N_i M_i^2}{\sum_i N_i M_i}$$

where $N_i$ is the number of molecules of molecular weight $M_i$. One method to calculate the $M_w$ is determined using gel permeation/size exclusion chromatography (GPC-SEC) as described in ASTM D5296 (2005).

$M_n$ is the number average of the molecular weights, calculated according to:

$$M_n = \frac{\sum_i N_i M_i}{\sum_i N_i}$$

where $N_i$ is the number of molecules of molecular weight $M_i$. One method to calculate $M_n$ is determined using the GPC-SEC method in ASTM D5296 (2005).

$M_z$ is a higher order molecular weight average, or the third power molecular weight, calculated according to:

$$M_z = \frac{\sum_i N_i M_i^3}{\sum_i N_i M_i^2}$$

where $N_i$ is the amount of substance of species i and $M_i$ is the molecular weight of species i. One method to calculate $M_z$ is determined using GPC-SEC method in ASTM D5296 (2005).

Polydispersity index (PDI) is calculated according to PDI=$M_w/M_n$.

Tg (glass-liquid transition or glass transition) may be determined according to ASTM D 6604 (2013).

$T_{sp}$ (softening point) may be determined by ASTM E28, or a ring and ball, or ring and cup softening point tests.

Tangent delta is expressed by a ratio of the measurement of energy lost as heat (loss modulus) versus the energy stored and released (storage modulus). Tan delta and other relating viscoelastic properties can be obtained using a dynamic viscoelastic tester. Good wet traction is predicted by a high value for G' (loss modulus) and tan delta at 0° C. Low rolling resistance is predicted by low tangent delta values at 50° C. and higher temperatures. Tan delta at 100° C. can be used as an indicator of tire grip and other enhanced performance characteristics under extreme use conditions.

Hydroxyl value (OH—) is a measure of the content of free hydroxyl groups, expressed in units of the mass of potassium hydroxide (KOH) in milligrams equivalent to the hydroxyl content of one gram of the chemical substance, determined per ASTM E222.

Properties such as tensile strength, elongation, and modulus can be measured following procedures described in ASTM D412.

Hardness refers to Hardness Shore A according to DIN 53506.

Mooney viscosity MS or ML (1+4) at 100° C. is according to DIN 53523.

Dynamic mechanical properties are measured via dynamic mechanical analysis (DMA) by a temperature-sweep in double shear mode from −60° C. to 100° C. with 1° C./min at 10 Hz and 0.1% (−60° C. till −5° C.) and 3% (−5° C. till 100° C.) dynamic strain using a Metravib+450N.

Tire Tread Wet Performance Predictive Properties are evaluated through the DMA by the Tan Delta at 0° C. (tan δ0° C.) and higher value of the index of wet grip performance, as obtained by Equation 5, are predictive of better wet grip performance.

Index of wet grip performance=(tan δ0° C. Comparative Example)/(tan δ0° C. of reference formulation)×100.

Tire Tread Rolling Resistance Predictive Properties are evaluated through the DMA by the Tan Delta at 60° C. (tan δ60° C.) and lower values of the index of fuel efficiency, as obtained by Equation 7, are predictive of beneficial reduction in tire rolling resistance.

Index of fuel efficiency=(tan δ60° C. of reference formulation)/(tan δ60° C. Comparative Example)×100.

Tire Tread Winter Predictive Performance is evaluated through the DMA by the G' at −20° C. (G'−20° C.) and lower values of the index of winter performance, as obtained by Equation 8, are predictive of beneficial improvement in tire winter performance.

Index of winter performance=(G'−20° C. of reference formulation)/(G'−20° C. Comparative Example)×100.

Tire Tread Dry Handling Performance is evaluated through the DMA by the G' at 30° C. (G'30° C.) and lower values of the index of dry handling, as obtained by the following Equation 9, are predictive of beneficial improvement in tire winter performance.

Index of dry handling=(G'30° C. Comparative Example)/(G'30° C. of reference formulation)×100.

"Resin dispersion" refers to a mixture of a resin composition within a fluid phase, e.g., an aqueous phase or organic fluid phase, for a slurry, an emulsion, or a solution.

Disclosed herein is a composition that can be used for a number of applications, including tires. The composition comprises a blend of the rubber component and based on 100 parts by weight (phr) of the rubber component and from 50 phr to 200 phr of a resin-covered silica.

Resin Covered Silica: The Resin Covered Silica has two components, namely a "Silica Core" and a "First Resin" covering the Silica Core. The Covered Silica comprises from 1% to 70% of the First Resin, or from 3% to 50% of the First Resin, or from 5 to 30% of the First Resin, the percentage being expressed in terms of total weight of the Covered Silica.

Silica Core: The Silica Core can be formed of any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. Further examples include silica having a BET surface area, as measured using nitrogen gas, from 40 to 600 m²/g, or 50 to 250 m²/g, or 90 to 215 m²/g. In one embodiment, the silica is characterized by having a dibutylphthalate (DBP) absorption value in a range of 100 to 400.

In embodiments, the silica has an average primary particle size as determined by the electron microscope in the range of 0.01 to 2000 micron. In embodiments, the silica has an average primary particle size of <1500 μm, <1000 μm, <100 μm, or <80 μm, or <50 μm, or >30 μm, or from 50-10,000 nm, or 5-1000 nm, or less than 10 nm. The primary particle size refers to the size of each of the minute separate particles themselves.

Various commercially available amorphous synthetic precipitated silicas (precipitated silicas) can be used as Silica Core. Such silicas may be characterized, for example, by their BET and CTAB surface areas. CTAB specific surface area (measured in accordance with ASTM d D3765 d 80) of the silica ranges from 100 to 300 m²/g. In an embodiment, CTAB specific surface area (measured in accordance with ASTM d D3765 d 80) of the silica ranges from 60 to 200 m²/g, or 120 to 250 m²/g. Representative of such silicas, for example only and without limitation, are silicas from PPG Industries under the Hi-Sil trademark with designations 210, 243, etc.; silicas from Rhodia, with designations of Zeosil 1 165MP and Zeosil 165GR, silicas from Evonic with designations VN2 and VN3, and silicas from Huber such as Zeopol 8745 and Zeopol 8715.

In embodiments, the Silica Core comprise amorphous silica having a loss on drying of up to about 9%, a pH of about 5 to 10 about 9, an ignition loss of about 6% to about 12%, a soluble salt content of up to about 2%, and a BET or CTAB specific surface area of about 50 to about 250 m²/g.

It should be noted that in addition to silica or in place of silica for use as Silica Core, other materials can also be used and coated with resins, e.g., carbon black.

The First Resin: The First Resin can be any of a terpene-based resin, a hydrocarbon-based resin, a rosin-based resin and combinations thereof. For use in coating the Silica, the First Resin can be in a form of a hard resin dissolved in an organic solvent, a liquid resin (at room temperature), or a resin dispersion and/or emulsion.

In one embodiment, the First Resin is a terpene resin which comprises α-pinene, β-pinene, δ-3 carene, limonene, dipentene, β-phellandrene and pyrolysates of α-pinene, β-pinene, δ-3 carene, δ-2 carene, turpentine, dipentene, limonene, and combinations thereof. Other examples of terpene resins include polyterpene resins and terpene phenol resins. The polyterpene resin is a resin obtained by polymerizing a terpene compound, or a hydrogenated product of the resin. Examples of terpene phenol resins include resins prepared by cationic polymerization of the terpene compound, a phenol compound, and condensation reactions with formalin. Examples of the phenol compound include phenol, bisphenol A, cresol, and Xylenol.

In another embodiment, the First Resin is an aromatic petroleum resin, for example, resins obtained by polymerizing a C8 to C10 aromatic fraction which is generally obtained by naphtha cracking and which includes, as a main monomer, vinyltoluene, indene, or methylindene. Other aromatic fractions include styrene analogues such as α-methylstyrene or β-methylstyrene and styrene. The aromatic petroleum resin may contain a coumarone unit. The aromatic petroleum resin may also contain an aliphatic olefin unit, a phenol unit, or a cresol unit. Examples of the aromatic petroleum resins include coumarone-indene resins, indene resins, aromatic vinyl polymers (resins obtained by polymerizing α-methylstyrene and/or styrene), and C9 hydrocarbon resins. Other examples include substituted or unsubstituted units derived from cyclopentadiene homopolymer or copolymer resins, dicyclopentadienehomopolymer or copolymer resins, C5 fraction homopolymer or copolymer resins, C9 fraction homopolymer or copolymer resins, alpha-methylstyrene homopolymer or copolymer resins, and combinations thereof.

In yet another embodiment, the First Resin is a rosin-based resin, selected from a rosin ester-based resin, a rosin oligoester based resin, and combinations thereof.

In one embodiment of a hard resin, the First Resin comprises hydrocarbon resin based on monomers such as derived from C5, C5/C9, DCPD, terpenes, eventually aromatically modified with alpha-methyl styrene, vinyl toluene, vinyl mesitylene, tertiary butyl styrene. Examples of commercially available hard resins include SYLVATRAXX 4202, 5216, 4401, 6720, Oppera PR373, 383 and 393, Escorez 5340, Escorez 5637, Quintone A100, Polyster T160, SYLVARES RE100L, SYLVATAC RE95.

In one embodiment of a soft resin (liquid resin), the First Resin has a softening point in the range of −20 to 45° C.; or 0° C. and 25° C.; or between 10° C. and 25° C. Based on the fact that the soft resin is very close to the softening point at room temperature (23° C.), it is either already liquid or very soft at room temperature. A soft resin may be a natural resin or synthetic resin. Examples of soft resins include medium to higher-molecular weight compounds from the classes of paraffin resins, hydrocarbon resins, polyolefins, polyesters, polyethers, polyacrylates or amino resins.

In embodiments, the First Resin is a liquid aromatic petroleum resin having a softening point within the above range, e.g., liquid coumarone-indene resins, liquid terpene resins, and liquid rosin resins. Examples of suitable soft resins include, for example, polyterpene resins sold commercially as Sylvares TR A25 from Kraton Chemical.

In other embodiments, the First Resin is an aliphatic C5-C9 hydrocarbon resin. Examples include aliphatic C5 hydrocarbon resins, e.g., resins commercially marketed under the Wingtack name. Other examples of soft resins include hydrocarbon resins, for example, Picco A10 and Regalite R1010. Further examples of suitable soft resins include Escorez™ 5040 from ExxonMobil Chemical.

In embodiments, the First Resin comprises a rosin resin, e.g., gum rosin, wood rosin, tall oil rosin, or dismutation products obtained by dismutation of the rosin material, stabilized rosins obtained by hydrogenating rosins, and polymerized rosins; esterified rosins (rosin ester resins), phenol-modified rosins, unsaturated acid (e.g., maleic acid)-modified rosins and formylated rosins obtained by reducing rosins. Examples include rosin esters and tall resin esters, commercially available as Sylvatac RE12, RE10, RE 15, RE20, RE25 or RE40 from Kraton Chemical.

In embodiments, the First Resin comprises a resin in an aqueous dispersion with a solids content of from 35% to 80%. An example is a rosin resin in an aqueous dispersion, e.g., AQUATAC 6025 from Kraton Chemical with a softening point of 26° C. and a solid content of 59-63 wt. %. Yet another example is an aqueous dispersion with 50% rosin acids in aqueous solution (SNOWTACK 765A from Lawter), or 55% rosin esters in dispersion (SNOWTACK SE780G from Lawter). Other examples include aliphatic hydrocarbon resin in an aqueous, solvent free, dispersion such as TACOLYN 5002 from Eastman Chemical with a softening point of 70-130° C. and a solid content of 45-50%.

In embodiments, the First Resin has a Mw ranging from 400 g/mol to 2000 g/mol; or from 500 g/mol to 1500 g/mol. In embodiments, the First Resin has a Mz ranging from 1300 g/mol to 3500 g/mol.

In embodiments, the First Resin is characterized as having a melt viscosity at 177° C. of 50 to 15000 mPa·s; or greater than 100 mPa·s; or less than 14500 mPa·s. Melt viscosity is measured under the conditions of the number of revolutions of 3 rpm and a temperature of 177° C. with a Brookfield RTV viscometer. In embodiments, the First Resin is characterized as having a Tsp in the range of from 80° C. to 170° C., or from 100° C. to 160° C., or from 125° C. to 155° C.

In embodiments, the First Resin has a Tg from −40° C. to +120° C., or from −35° C. to 100° C.

In embodiments, the First Resin is characterized by a hydroxyl number to ranging from 0 mg KOH/g to 30 mg KOH/g, or from 2 mg KOH/g to 20 mg KOH/g, or from 4 mg KOH/g to 15 mg KOH/g.

In embodiments, the First Resin is characterized as having a polydispersity index (PDI) of from 1.25 to 2.5, or from 1.3 to 2.0, or from 1.32 to 1.8.

In embodiments, the First Resin has a softening point of 60° C. or more; a glass transition temperature from −30° C. to 100° C.; a Brookfield Viscosity (ASTM D-3236) of 50 to 25,000 mPa·s at 177° C.

Method for Preparing Resin Covered Silica: In embodiments, the First Resin is present in a form of resin dispersion for the pre-coating of the Silica Core (finely divided silica), forming Resin Covered Silica.

In embodiments, the resin dispersion can be prepared by emulsifying the resin in the fluid phase at temperature above the resin's melting point, and then cooling to provide finely dispersed solid resin particulates within the fluid phase. In embodiments, the resin is liquid or liquefied for a sprayable solution, e.g., by dissolving the resin in an organic liquid or dispersing the resin in water.

In embodiments where the First Resin is a hard resin, the First Resin is dissolved in a solvent in a concentration ranging between 5 to 90% at an elevated temperature to form a melt. The melt is then dispersed in liquid phase. Water is an example of a dispersion medium, but various other solvents may be used. Examples of solvent for use in dissolving the First Resin include but are not limited to toluene, ethylacetate, methylethylketone, hexane.

The Resin Covered Silica in one embodiment is prepared by first forming a slurry of Silica Core. By way of a non-limiting example, finely divided silica core is mixed with a liquid medium such as water or alcohol to obtain a silica slurry. In the next step, the silica surface is treated or coated by mixing with the First Resin as a resin dispersion, forming a mixture.

In another embodiment, the Resin Covered Silica is prepared by mixing finely divided silica (dry form) into a resin dispersion, forming a mixture. The finely divided silica are immersed in the resin dispersion for the resin to coat at least a surface of the finely divided silica, preferably the entire surface.

In yet another embodiment, the resin dispersion is sprayed onto the finely divided silica, e.g., in a mixing tank equipped with sprayer, for uniform coating of the finely divided silica with the resin dispersion, forming Resin Covered Silica.

In embodiments after coating the silica with the resin, the resin coating layer formed on the divided silica particles can be subsequently dried (e.g., air dried, or using pressurized air).

In yet other embodiments, after coating with the First Resin, the Resin Covered Silica can undergo a second coating, e.g., with the same resin or a resin different from the First Resin, or a composition different from a First Resin, e.g., a silane. In yet other embodiments, the finely divided silica is first coated with composition different from the First Resin, e.g., a functional silane before being coated with the First Resin. It is noted that the average primary particle size of the final Resin Covered Silica remains essentially the same as the starting finely divided silica particles, e.g., having an increase in average primary particle size of <10%, <5%, <3%, and <2% after each coating.

In embodiments where a soft resin is used as a First Resin, it is optional to add a solvent prior to mixing the First Resin with the slurry of Silica Core.

The concentration of Silica Core in the resin dispersion (slurry) can be varied. In embodiments, silica slurries can contain 0.1% to 75% by weight silica based on the weight of the slurry. In some embodiments, the silica concentration ranges from 10 to 20 wt. %, or 0.1-75 wt. %, or 1-20 wt. %, or 5-50 wt. %, or 10-35 wt. %, or 10-25 wt. %.

The concentration of the First Resin in the mixture of slurry and First Resin for coating the Silica Core can also vary within relatively wide limits, e.g., any of 1 to 75 wt. %; 5 to 40 wt. %; and over 10 wt. %.

In the process based on the First Resin used for coating, the temperature of the mixture is suitably maintained to for the First Resin to uniformly coat the Silica Core, and for the removal of the liquid medium from the mixture, based on the nature of the liquid medium used in forming the slurry, and can be varied within relatively wide limits.

Figure 5:
FIG. 5 is a photograph of an embodiment of the Resin Covered Silica, as separate minute particles.

After the coating and drying steps, the First Resin is not chemically bonded to the Silica Core. The Resin Covered Silica remains in the form of minute separate particles as shown in FIG. 5. The particle size of Resin Covered Silica remains essentially unchanged, with an average primary particle size within 10% of the average primary particle size of the starting Silica Core (prior to being coated or covered with the First Resin). In embodiments, the average primary particle size of the Resin Covered Silica particle size has just a slight increase, of less than 10% compared to the average primary particle size of the starting (uncoated) silica particles, or an increase of less than 5%, or an increase of less than 3%, or an increase of less than 2%, or essentially the same as the starting Silica Core.

It is also observed that the surface area of the Resin Covered Silica (coated silica particulates) remains essentially the same as the surface area of the starting Silica Core (uncoated silica particulates).

In embodiments, the Resin Covered Silica in the form of minute separate particles has an average primary particle size of <100 µm, or <80 µm, or <50 µm, or >30 µm, or from 50-10,000 nm, or 5-1000 nm, or less than 20 µm; with BET surface area of 5-500 $m^2/g$, or 10-300 $m^2/g$, or less than 250 $m^2/g$, or at least 50 $m^2/g$. The primary particle size refers to the size of each of the minute separate particles themselves.

Rubber Component: The term "rubber" or "elastomer" include both natural rubber and its various raw and reclaim forms, as well as various synthetic rubbers.

In embodiments, the rubber component comprises any of unsaturated diene elastomer selected from polybutadienes, natural rubber, synthetic polyisoprenes, butadiene copolymers, isoprene copolymers and the mixtures of such elastomer. In one embodiment, the rubber is selected from butyl rubber, halogenated butyl rubber, and EPDM (Ethylene Propylene Diene Monomer rubber), and mixtures thereof. In another embodiment, the rubber component is selected from natural rubber (NR), styrene-butadiene rubber (SBR), butadiene rubber (BR), synthetic polyisoprene rubber, epoxylated natural rubber, polybutadiene rubber, nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or dienemonomer copolymers, brominated-NR, chlorinated-NR, brominated isobutylene p-methylstyrene copolymer, chloroprene rubber, epichlorohydrinhomopolymers rubber, epichlorohydrin-ethylene oxide or allylglycidyl ether copolymer rubbers, epichlorohydrin-ethylene oxide-allylglycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

Examples of SBR rubber include an emulsion-polymerized styrene-butadiene rubber (un-modified E-SBR), a solution-polymerized styrene-butadiene rubber (un-modified S-SBR) and modified SBRs obtained by modifying terminals thereof (modified E-SBR and modified S-SBR) can be used. In one embodiment, the rubber component comprises rubber components other than the SBR and the BR such as a natural rubber (NR), an isoprene rubber (IR), an epoxidized natural rubber (ENR), a butyl rubber, an acrylonitrile butadiene rubber (NBR), an ethylene propylene diene rubber (EPDM), a chloroprene rubber (CR) a styrene-isoprene-butadiene rubber (SIBR), used alone or in combinations as needed.

The rubber component may be coupled, star-branched, branched, and/or functionalized with a coupling and/or star-branching or functionalization agent. The branched rubber can be any of branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

In embodiments, the rubber is end-group functionalized to improve its affinity for fillers, such as carbon black and/or silica. In one embodiment, the functionalized rubber made by living polymerization techniques is compounded with sulfur, accelerators, antidegradants, a filler, such as carbon black, silica or starch, and other suitable chemicals. Examples of coupling and/or star-branching or functionalizations include coupling with carbon black as a filler, e.g., with functional groups comprising a C—Sn bond or of aminated functional groups, such as benzophenone; coupling with a reinforcing filler, such as silica, e.g., silanol functional groups or polysiloxane functional groups having a silanol end; alkoxysilane groups, polyether groups.

In embodiments, the rubber component is a highly unsaturated rubber, end-chain functionalized with a silanol group. In embodiments, the rubber component is a functionalized diene rubber bearing at least on SiOR function, R being a hydrogen or a hydrocarbon radical. In yet another embodiment, the rubber component consists of SBR, or of SBR and BR for improved wet grip performance. In other embodiments, the rubber is epoxide-functionalized (or epoxidized), bearing epoxide functional groups. The epoxidized elastomer can be selected from the group consisting of epoxidized diene elastomers, epoxidized olefinic elastomers, and mixtures thereof.

Cross-Linking Agents: In one embodiment and depending on the rubber component used, the rubber component in the composition may be cross-linked by adding curative agents, for example sulfur, metals, metal oxides such as zinc oxide, peroxides, organometallic compounds, radical initiators, fatty acids, and other agents common in the art. Zinc oxide, typically at 5 phr, is added to form zinc halide that then acts as the catalyst for the vulcanization of the rubber compounds. Other known methods of curing that may be used include, peroxide cure systems, resin cure systems, and heat or radiation-induced crosslinking of polymers. Accelerators, activators, and retarders may also be used in the curing process.

The cross-linking agent content is preferably between 0.3 and 10 phr in one embodiment, or between 0.5 and 5.0 phr, or at least 0.5 phr in the rubber composition.

Second Resin: The composition may additionally comprise a Second Resin, which can be the same or different than the First Resin, and which is present in an amount less than the typical amount of resin required for the rubber composition to have the desired properties and performance. As with the First Resin, the Second Resin can be any of a terpene-based resin, a hydrocarbon-based resin, a rosin-based resin and combinations thereof.

The Second Resin herein includes substituted or unsubstituted units derived from cyclopentadiene homopolymer or copolymer resins (referred to as CPD), dicyclopentadiene homopolymer or copolymer resins (referred to as DCPD or (D)CPD), terpene homopolymer or copolymer resins, rosin derived resins, rosin/rosin esters, pinene homopolymer or copolymer resins, C5 fraction homopolymer or copolymer resins, C9 fraction homopolymer or copolymer resins, alpha-methylstyrenehomopolymer or copolymer resins, and combinations thereof. In one embodiment, the Second Resin may further include units derived from (D)CPD/vinylaromatic copolymer resins, (D)CPD/terpene copolymer resins, terpene/phenol copolymer resins, (D)CPD/pinene copolymer resins, pinene/phenol copolymer resins, (D)CPD/C5 fraction copolymer resins, (D)CPD/C9 fraction copolymer resins, terpene/vinylaromatic copolymer resins, terpene/phenol copolymer resins, pinene/vinylaromatic copolymer resins, pinene/phenol resins, C5 fraction/vinylaromatic copolymer resins, and combinations thereof.

In embodiments, the Second Resin is a terpene-based resin, e.g., a terpene phenol resin. In another embodiment, the Second Resin is a terpolymer derived from A) at least one monomer selected from the group consisting of terpenes and mono- and bi-cyclic mono- and bi-unsaturated hydrocarbons; B) at least one monomer selected from the group consisting of vinyl aromatic compounds and component; and C) at least one monomer selected from the group consisting of phenolic compounds. Examples of vinyl aromatic compounds include styrene and alkyl substituted styrene such as α-methyl styrene ("AMS"). In yet another embodiment, the Second Resin is a rosin/rosin ester-derived resin.

The Second Resin can be used in an amount from 3 to 100 phr; or from 5 to 70 phr; or from 8 to 30 phr, or less than 20 phr, used in an amount less than would be required if Resin Coated Silica was not present in the tire composition. In embodiment, the rubber composition includes any of 5, 10, 15, 20, 25, 30, 35, 40, or in any range from to or between any two of the foregoing numbers of the Second Resin.

Fillers: In one embodiment, the tire composition further includes fillers (other than Resin Coated Silica) in an amount from 50 to 200 phr. The term "filler" refers to any material that is used to reinforce or modify physical properties, impart certain processing properties, or reduce the cost of an elastomeric composition. Examples of fillers include, but are not limited to, calcium carbonate, carbon nanotube, clay, (uncoated) silica, mica, talc, titanium dioxide, alumina, zinc oxide, starch, wood flour, carbon black, or mixtures thereof. Other fillers may be used include, but are not limited to, particulate fillers including ultra-high molecular weight polyethylene (UHMWPE), particulate polymer gels, and plasticized starch composite fillers known in the art. The fillers may be any size and typically range from 0.0001 µm-100 µm.

Optional Plasticizer Component: "Plasticizer" (also referred to as a processing oil), refers to a petroleum-derived processing oil and synthetic plasticizer to extend elastomers and improve the processability of the composition. The amount of plasticizer is present in an amount of 0-35 phr, or 5 to 25 phr, or less than 20 phr. In some embodiments, plasticizer is present in an amount of weight ratio of resin to plasticizer of >1, or >3, or >6. Examples of plasticizers include aliphatic acid esters, hydrocarbon processing oils, tall oil pitch and modified tall oil pitch, and combinations thereof.

In embodiments, the plasticizer is a modified tall oil pitch selected from the group of a pitch ester, a decarboxylated tall oil pitch, a soap of tall oil pitch, a thermally treated tall oil pitch, and a thermally and catalytically treated tall oil pitch.

In embodiments, the plasticizer includes both extending oil present in the elastomers, and process oil added during compounding. Examples include aromatic, paraffinic, naphthenic, and low PCA oils, such as MES, TDAE, and heavy naphthenic oils, and vegetable oils such as sunflower, soybean, and safflower oils. Examples of low PCA oils include those having a polycyclic aromatic content of <3 wt. %. Suitable vegetable oils include, for example, soybean oil, sunflower oil and canola oil which are in the form of esters containing a certain degree of unsaturation.

Other Additives: The composition can be compounded with other components known in the art in amounts of up to 50 phr, or up to 30 phr, or up to 20 phr, such as sulfur donors, curing aids, such as accelerators, activators and retarders and processing additives, pigments, fatty acid, zinc oxide, waxes, antioxidants and antiozonants and peptizing agents.

Methods for Forming: The rubber composition can be formed by methods known to those having skill in the rubber mixing art. For example, the components are typically mixed in two or two stages, for example, at least one non-productive stage followed by a productive mix stage. The final curatives, e.g., sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

The Resin Coated Silica can be added in any stage, e.g., during at least one of the non-productive stage and productive mix stage. In an embodiment, the Resin Coated Silica can be added during the non-productive stage.

In a tire composition, the tire composition comprises from 20 phr to 150 phr of the Resin Covered Silica, or from 30 phr to 100 phr Resin Covered Silica, or from 50 phr to 75 Resin Covered Silica, or at least 10 phr Resin Covered Silica, or at least 20 phr Resin Covered Silica, or less than 200 phr.

The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Industrial Applicability: Besides tire applications, the composition can be extruded, compression molded, blow molded, injection molded, and laminated into various shaped articles including fibers, films, laminates, layers, industrial parts such as automotive parts, appliance housings, consumer products, packaging, and the like.

In tire applications, the composition is useful for a variety of tires such as truck tires, bus tires, automobile tires, motorcycle tires, off-road tires, aircraft tires, and the like. The compositions may also be fabricated into a component of a tire, e.g., treads, sidewalls, chafer strips, tire gum layers, reinforcing cord coating materials, cushion layers, and the like.

The composition can also be useful in a variety of applications, including tire curing bladders, inner tubes, air sleeves, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various bladders for fluid retention and curing processes. They are also useful as plasticizers in rubber formulations; as components to compositions that are manufactured into stretch-wrap films; as dispersants for lubricants; and in potting and electrical cable filling and cable housing materials.

The composition may also be useful in molded rubber parts such as automobile suspension bumpers, auto exhaust hangers, and body mounts. In yet other applications, compositions can also be useful in medical applications such as pharmaceutical stoppers and closures and coatings for medical devices.

It should be noted that the Resin Covered Silica can be used in applications other than tires, and in amounts depending on the applications and the matrix material, e.g., filler material such as anti-skid material for high-friction surface treatment, glass beads for road marking applications, rubber, etc. In embodiments, the concentration of the Resin Covered Silica with respect to the matrix material ranges from 0.1 to 50 wt. %, or 0.1-5 wt. %, or 1-10 wt. %, or 5-20 wt. %, or 15-30 wt. %, or 25-50 wt. %.

Properties: Not wishing to be bound by theory, it is believed that with the use of the Resin Covered Silica, the resin is not chemically bonded to the silica core, allowing the resin to be released into the composition during mixing, thereby delivering the desired changes in viscoelastic properties to achieve improved performance. Further, the resin coating reduces the hydrophilic character of the silica conglomerates. With the elastomer matrices having a hydrophobic character, the resin coating improves the incorporation of the silica coated with resin component into the elastomer matrices when compared with its equivalent virgin silica. Additionally, the use of resin coated silica enables the composition to be substantially free of silica coupling agent, further reduce costs.

Further, pre-formed Resin Covered Silica helps avoid issues related to handling polymer resins, which are sticky, tacky substances. In the traditionally practiced method of compounding all of the separate ingredients in a mixing device, one has to deal with the difficult task of handling the sticky and tacky resins. A pre-formed Resin Covered Silica allows for more uniform dispersion of both the silica and resin as particles throughout the rubber composition used in making tire treads. Lastly, pre-formed Resin Covered Silica helps obviate the strong silica-silica interaction, which can occur when silica and resin are mixed together as separate individual components. The pre-forming avoids the agglomeration of the silica particles, and in turn promotes better silica-elastomer interaction in the compounding step.

In tire applications, the use of Resin Covered Silica has showed to enhance the performance of a tire. In embodiments, tire compositions show significant reduction in rolling resistance and improvement in wet grip performance, as compared to compositions with equal amounts of silica and the resin as separate components.

With respect to reduction in rolling resistance, tire compositions with the Resin Covered Silica in embodiments show a tan δ at 60° C. that is at least at least 3% less, or at least 5% less, or at least 8% less than the tan δ at 60° C. of a composition with equal amounts of silica and the resin as separate components.

With respect to improved wet traction (wet grip properties), the tire composition shows at least 5% improvement in tan δ at 0° C., or at least 10%, or at least 15%, or at least 25% improvement over the tan δ at 0° C. of a tire composition with equal amounts of silica and the resin as separate components.

With respect to DIN abrasion assistance, in embodiments, tire compositions with the Resin Covered Silica has a DIN abrasion value improvement of at least 5%, or at least 10%, or at least 15%, over the DIN abrasion value of a comparable composition containing equal amounts of silica and the resin as separate components.

In embodiments, the composition has a DIN abrasion relative volume loss of less than 150 mm³, or less than 125 mm³, or less 100 mm³, or from 60 to 120 mm³.

In embodiments, the tire rubber composition has a tan δ at 60° C. of 0.20 or less, or between 0.08 to 0.20, or less than 0.18, or less than 0.16, or less than 0.14, or less than 0.10.

In embodiments, the tire rubber compositions have a tan δ at 0° C. of at least 0.50, or at least 0.57, or between 0.58 to 0.65, or at least 0.60.

Examples: The following examples are intended to be non-limiting.

Different compositions having formulations shown in Table 1 are prepared. Chemicals other than sulfur and a vulcanization accelerator were kneaded with a 0.2 L enclosed mixer at the temperature at the discharge of 150° C. for 5.5 minutes to obtain a kneaded product. Then the kneaded product was re-milled for 4 minutes up to a temperature of 145° C. Then, the kneaded product, sulfur and the vulcanization accelerator, were mixed using the same mixer for 2 minutes until the temperature reached 100° C. to obtain an unvulcanized rubber composition. The obtained unvulcanized rubber composition was formed. Rubber sample preparation for testing was done according to ISO 23529:2010

Resin A is a rosin ester based resin from with a Tg of −23° C. and an acid value of 60-80. Resin B is a polyterpene based resin with a Tg of −19° C. Both are commercially available from Kraton Chemical. SCR-20A is precipitated silica covered with 20% in virgin silica weight of resin A. SCR-20-B is precipitated silica covered with 20% in virgin silica weight of resin B. The precipitated silica is of the type commonly used in tire formulations.

TABLE 1

Formulations (in phr) and performance properties

| | Comparative Examples | | | Examples | | | |
|---|---|---|---|---|---|---|---|
| | 1 | 4 | 7 | 2 | 3 | 5 | 6 |
| SBR1 | 48 | 48 | 48 | 48 | 48 | 48 | 48 |
| BR | 30 | 30 | 30 | 30 | 30 | 30 | 30 |
| SBR2 | 35 | 35 | 35 | 35 | 35 | 35 | 35 |
| Silica | 80 | 80 | 80 | | | | |

TABLE 1-continued

Formulations (in phr) and performance properties

| | Comparative Examples | | | Examples | | | |
|---|---|---|---|---|---|---|---|
| | 1 | 4 | 7 | 2 | 3 | 5 | 6 |
| SCR-20A | | | | 80 | 96 | | |
| SCR-20B | | | | | | 80 | 96 |
| Resin A | | | 16 | | | | |
| Resin B | | 16 | | | | | |
| Carbon Black | 5 | 5 | 5 | 5 | 5 | 5 | 5 |
| Silane | 8 | 8 | 8 | 8 | 8 | 8 | 8 |
| Zinc Oxide | 3 | 3 | 3 | 3 | 3 | 3 | 3 |
| Stearic acid | 2 | 2 | 2 | 2 | 2 | 2 | 2 |
| Anti ageing agents | 3.5 | 1 | 1 | 1 | 1 | 1 | 1 |
| Wax | 1 | 1 | 1 | 1 | 1 | 1 | 1 |
| Oil | 20 | 4 | 4 | 20 | 4 | 20 | 4 |
| CBS | 1.9 | 1.9 | 1.9 | 1.9 | 1.9 | 1.9 | 1.9 |
| DPG | 2.5 | 2.5 | 2.5 | 2.5 | 2.5 | 2.5 | 2.5 |
| Sulfur | 2.3 | 2.3 | 2.3 | 2.3 | 2.3 | 2.3 | 2.3 |
| Evaluation | | | | | | | |
| Index of wet grip performance | 100 | 111 | 118 | 98 | 119 | 92 | 114 |
| Index of Dry grip | 100 | 106 | 141 | 100 | 139 | 79 | 109 |
| Index of fuel efficiency | 100 | 94 | 69 | 95 | 72 | 120 | 92 |
| Index of winter performance | 100 | 84 | 57 | 149 | 56 | 208 | 78 |
| Index of dry handling | 100 | 94 | 129 | 65 | 132 | 49 | 97 |

* CBS = N-cyclohexyl-2-benzothiazolesulfenamide
* DPG = 1,3-diphenylguanidine

The comparative examples use a virgin silica in combination with either oil (1), or with one the resin A or B replacing the oil. Both resins show an improvement in the wet grip performance indicators. The rosin ester resin (7) gives more improvement than the polyterpene (4) in term of wet grip, dry grip and dry handling indicator. The polyterpene will nevertheless give a better balance of wet grip/rolling resistance balance.

When the covered silica is used, comparing (4) and (6) or (7) with (3), where the virgin silica level and resin level were kept the same, shows comparable effect. This show that silanisation is taking place, and that the resin which was initially covering the silica surface does not appear to have any detrimental effect.

By replacing the virgin silica part by part by the covered silica, the total amount of silica in the formulation (2) and (5) is reduced. Reducing the quantity of silica should reduce the wet grip indicator and improve the rolling resistance and the winter performance as it could be observed when comparing (1) (5). But when comparing (1) and (2), the results show that the dry grip and wet grip indicators are maintained and the winter performance greatly improves.

Liquid rosin ester can be used in tire rubber compositions to improve wet grip indicator, dry grip indicator, and handling indicator. The use of resin coated silica gives the same results as if resin and silica were mixed separately, demonstrating that these resins do not influence the silanisation. As shown for use in tire treads, the use of a resin coated silica gives the same final compound properties as if the two components (silica and resin) are mixed separately. In another example, it is shown that the winter performance can be improved without compromising the wet grip performance. In another example, the use is shown to improve the wet grip indicator and the dry grip indicator. In another, use of resin coated silica is shown to improve the wet grip indicator with limited effect on the rolling resistance indicator.

Figure 3:
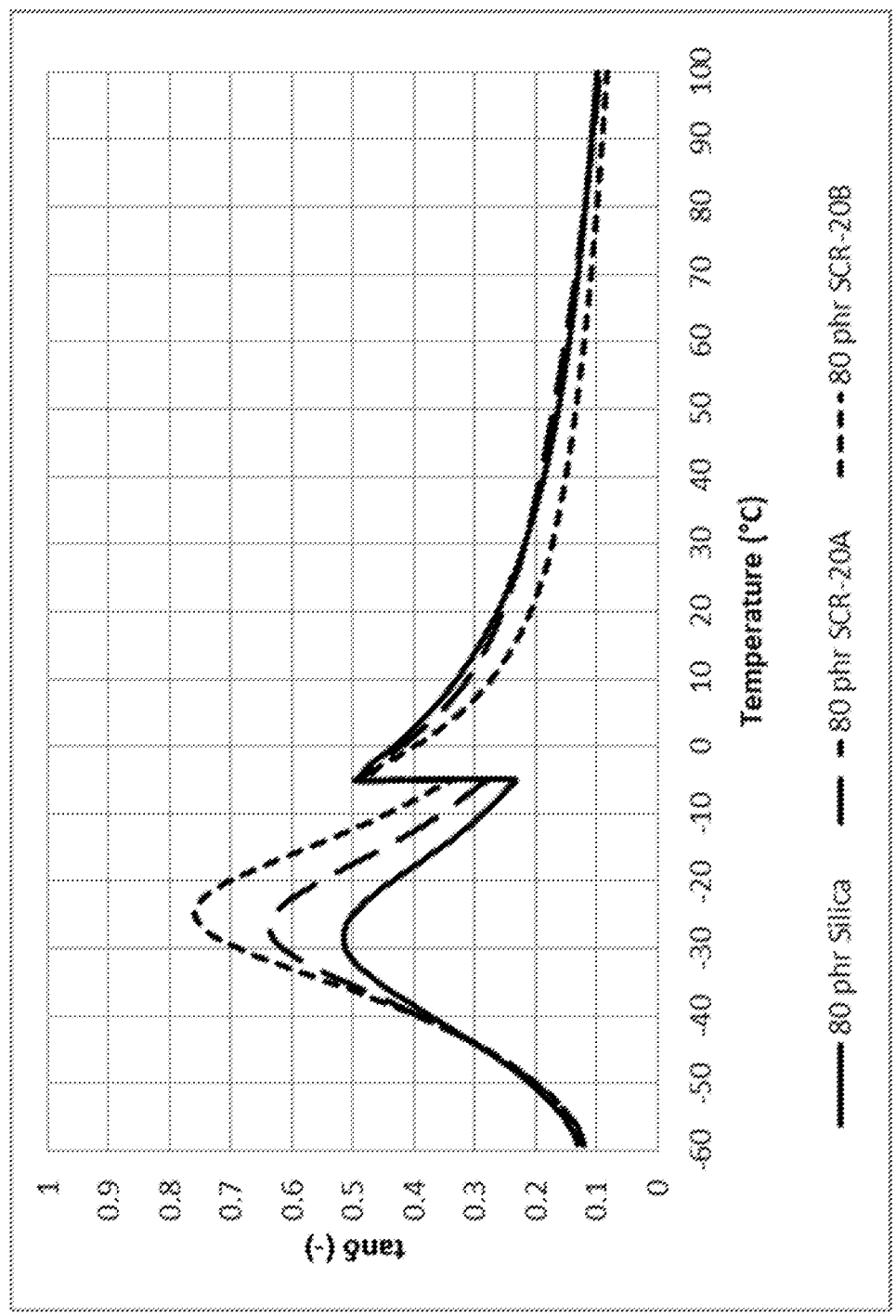
FIG. 3 is a graph illustrating tangent delta vs. temperature performance of the formulation of Examples 1, 2 and 5.
Figure 4:
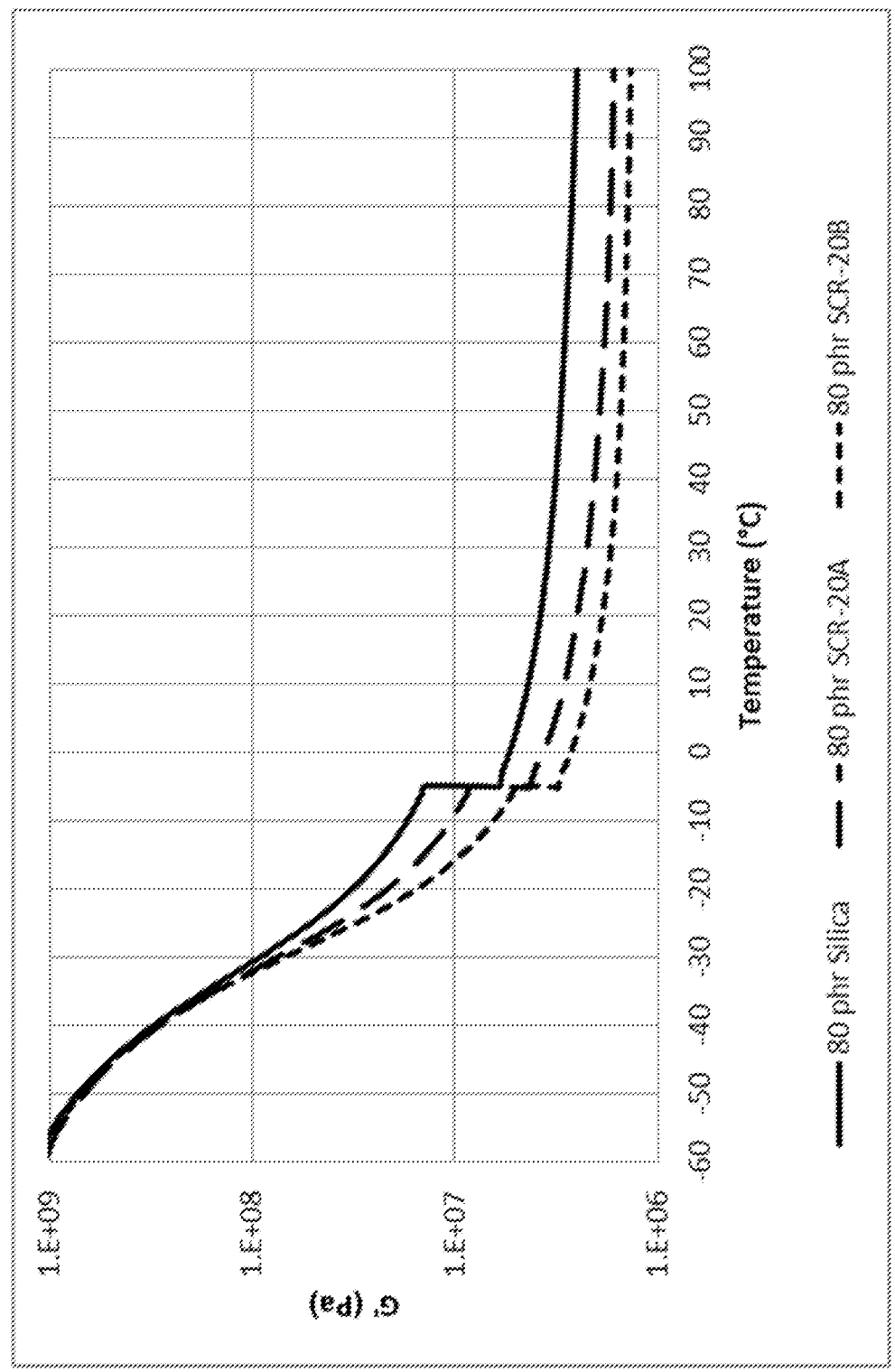
FIG. 4 is a graph illustrating loss modulus vs. temperature performance of the formulation of Examples 1, 2 and 5.

The results are also illustrated with the Figures, including: FIG. 1, a graph illustrating tangent delta vs. temperature performance of the formulation of Examples 1, 3 and 7; FIG. 1, a graph illustrating loss modulus vs. temperature performance of the formulation of Examples 1, 3 and 7; FIG. 3, a graph illustrating tangent delta vs. temperature performance of the formulation of Examples 1, 2 and 5; and FIG. 4, a graph illustrating loss modulus vs. temperature performance of the formulation of Examples 1, 2 and 5.

Example 7: This example is for a production run with large mixing equipment (~400 L Banbury, which does not mix as well as with lab scale equipment of 1.5 L Banbury), a rubber composition containing pre-formed resin covered silica showed a dramatic increase in performance. Table 2 shows results with a 10% increase in dry traction tests (tan delta @ 30° C.) and a 20% increase in wet traction test (tan delta @ 0° C.) over a rubber composition with resin and silica as separate components and combined together in-situ.

TABLE 2

| Performance Parameters | Lab Indicator | Test Track Control Tires (Indexed) | Test Track Experimental Tires (Indexed) |
|---|---|---|---|
| Dry Traction (Higher is Better) | Tan Delta @ 30 C. | 100 | 110 |
| Wet Traction (Higher is Better) | Tan Delta @ 0 C. | 100 | 120 |

Embodiments herein include:

1. A composition comprising: a particulate material; and a resin composition comprising a rosin-based resin, a terpene-based resin, a C5-C9 resin, a hydrogenated resin, a polymerization-modified rosin resin, a styrenated terpene resin, a polyterpene resin, a phenolic terpene resin, a resin dispersion, an α-methyl styrene monomer resin, an α-methyl styrene phenolic resin, or any combination thereof pre-coated onto a surface of the particulate material.

2. The composition of claim 1, wherein the particulate material comprises silica particulates.

3. The composition of claim 2, wherein the resin composition comprises a rosin-based resin, a terpene-based resin, or any combination thereof.

4. The composition of claim 3, wherein the resin composition comprises a rosin ester resin, a liquid polyterpene resin, or any combination thereof.

5. The composition of claim 3, wherein the resin composition comprises a rosin ester resin, a liquid polyterpene resin, or any combination thereof.

6. The composition of claim 2, wherein the silica particulates comprise precipitated silica.

7. The composition of claim 2, wherein the resin composition is covalently bonded to a surface of the silica particulates.

8. The composition of claim 2, further comprising: a matrix in which the silica particulates are dispersed to form a matrix blend, the matrix comprising a rubber material or a polymer material.

9. The composition of claim 8, wherein the silica particulates are uniformly dispersed in the matrix blend.

10. A composition comprising: a plurality of particulates comprising precipitated silica; and a biologically derived resin composition pre-coated onto a surface of the plurality of particulates, the biologically derived resin composition being covalently bonded thereto.

11. The composition of claim 10, wherein the biologically derived resin composition comprises a rosin-based resin, a terpene-based resin, or any combination thereof.

12. The composition of claim 11, wherein the biologically derived resin composition comprises a rosin ester resin, a liquid polyterpene resin, or any combination thereof.

13. The composition of claim 11, further comprising: a matrix in which the plurality of particulates is dispersed to form a matrix blend, the matrix comprising a rubber material or a polymer material.

14. The composition of claim 10, further comprising: a matrix in which the plurality of particulates is dispersed to form a matrix blend, the matrix comprising a rubber material or a polymer material.

15. A tire comprising the composition of claim 13.

16. A tire comprising the composition of claim 14.

17. A method comprising: providing a plurality of particulates; and pre-coating a resin composition onto a surface of the plurality of particulates; wherein the resin composition comprises a rosin-based resin, a terpene-based resin, a C5-C9 resin, a hydrogenated resin, a polymerization-modified rosin resin, a styrenated terpene resin, a polyterpene resin, a phenolic terpene resin, a resin dispersion, an α-methyl styrene monomer resin, an α-methyl styrene phenolic resin, or any combination thereof.

18. The method of claim 17, wherein the resin composition comprises a rosin-based resin, a terpene-based resin, or any combination thereof.

19. The method of claim 18, wherein the resin composition comprises a rosin ester resin, a liquid polyterpene resin, or any combination thereof.

20. The method of claim 17, wherein the plurality of particulates comprises silica particulates.

21. The method of claim 20, wherein the resin composition is covalently bonded to a surface of the silica particulates.

22. The method of claim 20, wherein the silica particulates comprise precipitated silica particulates.

23. The method of claim 20, wherein the resin composition comprises a rosin-based resin, a terpene-based resin, or any combination thereof.

24. The method of claim 17, further comprising: after pre-coating, blending the plurality of particulates with a matrix to form a matrix blend, the matrix comprising a rubber material or a polymer material.

25. The method of claim 24, wherein the plurality of particulates is uniformly dispersed in the matrix blend.

26. The method of claim 24, further comprising shaping the matrix blend to form a tire.

27. A method comprising: providing a plurality of particulates comprising precipitated silica; and pre-coating a biologically derived resin composition onto a surface of the plurality of particulates, the biologically derived resin composition being covalently bonded thereto.

28. The method of claim 27, wherein the biologically derived resin composition comprises a rosin-based resin, a terpene-based resin, or any combination thereof.

29. The method of claim 28, wherein the biologically derived resin composition comprises a rosin ester resin, a liquid polyterpene resin, or any combination thereof.

30. The method of claim 28, further comprising after pre-coating, blending the plurality of particulates with a matrix to form a matrix blend, the matrix comprising a rubber material or a polymer material.

31. The method of claim 30, wherein the plurality of particulates is uniformly dispersed in the matrix blend.

32. The method of claim 27, further comprising shaping the matrix blend to form a tire 33. The method of claim 27, further comprising after pre-coating, blending the plurality of particulates with a matrix to form a matrix blend, the matrix comprising a rubber material or a polymer material.

34. The method of claim 33, wherein the plurality of particulates is uniformly dispersed in the matrix blend.

35. The method of claim 33, further comprising shaping the matrix blend to form a tire.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A tire composition comprising a blend of:
   a rubber component and based on 100 parts by weight (phr) of the rubber component;
   from 50 phr to 200 phr of a resin-covered silica having an average primary particle size of <1000 μm,
   from 50 phr to 200 phr of at least one filler; and
   from 0 phr to 50 phr of a plasticizer;
   wherein the resin-covered silica is formed in a process consisting essentially of coating finely divided silica core with a composition consisting essentially of a resin to coat at least a surface of the finely divided silica core forming the resin-covered silica as separate silica particles coated with the resin,
   wherein the resin is not chemically bonded to the finely divided silica core, and
   wherein the resin is selected from the group consisting of:
   a coumarone-indene resin consisting of coumarone and indene repeat units,
   a petroleum hydrocarbon resin, consisting of petroleum hydrocarbon repeat units, and optionally, aliphatic olefin units, phenol units, or cresol units;
   a terpene-based resin selected from the group consisting of a polyterpene resin and a terpene phenol resin, wherein the polyterpene resin consists of terpene repeat units; and the terpene phenol resin consists of terpene and phenol repeat units;
   a styrene-alpha-methylstyrene resins consisting of styrene and alpha-methylstyrene repeat units;
   rosin derived resins and copolymers; and
   and mixtures thereof.

2. The tire composition of claim 1, where the separate silica particles coated with the resin have an average primary particle size difference of less than 10% as compared to the average primary particle size of the finely divided silica core.

3. The tire composition of claim 2, where the separate silica particles coated with the resin have an average primary particle size increase of less than 2% as compared to the average primary particle size of the finely divided silica core.

4. The tire composition of claim 1, wherein coating the finely divided silica core with a composition consisting essentially of the resin comprises:
   providing a dispersion comprising the resin;
   mixing the finely divided silica core with the dispersion to form a mixture, wherein at least a surface of the finely divided silica core is coated with the resin; and
   drying the mixture to form the resin-covered silica as separate silica particles coated with the resin.

5. The tire composition of claim 1, comprising from 50 phr to 150 phr of the resin-covered silica.

6. The tire composition of claim 1, wherein the finely divided silica core is silica or silicic acid derivatives selected from the group consisting of untreated, precipitated silica, crystalline silica, colloidal silica, aluminum silicates, calcium silicates, fumed silica, and mixtures thereof.

7. The tire composition of claim 1, wherein the finely divided silica core comprises precipitated silica having a CTAB specific surface area ranging from 60 to 200 m$^2$/g.

8. The tire composition of claim 1, wherein the finely divided silica core comprises precipitated silica having a BET surface area, as measured using nitrogen gas, from 40 to 600 m$^2$/g.

9. The tire composition of claim 1, wherein the terpene units are selected from the group consisting of α-pinene units, β-pinene units, δ-3 carene units, limonene units, dipentene units, β-phellandrene units, α-pinene pyrolysate units, β-pinene pyrolysate units, δ-3 carene pyrolysate units, δ-2 carene pyrolysate units, turpentine pyrolysate units, dipentene pyrolysate units, limonene pyrolysate units, and combinations thereof.

10. The tire composition of claim 1, wherein the rosin derived resins and copolymers are rosin-based selected from the group consisting of a rosin ester-based resin, a rosin oligoester based resin, and combinations thereof.

11. The tire composition of claim 1, wherein the resin has a softening point in the range of −20 to 45° C.

12. The tire composition of claim 11, wherein the petroleum hydrocarbon resin is selected from the group consisting of coumarone-indene resins, indene resins, aromatic vinyl polymers obtained by polymerizing α-methylstyrene and/or styrene, C9 hydrocarbon resins, resins derived from cyclopentadiene homopolymer or copolymer resins, dicyclopentadiene homopolymer or copolymer resins, C5 fraction homopolymer or copolymer resins, C9 fraction homopolymer or copolymer resins, alpha-methylstyrene homopolymer or copolymer resins, and combinations thereof.

13. The tire composition of claim 1, wherein the rubber component is selected from the group of natural rubber (NR), styrene-butadiene rubber (SBR), butadiene rubber (BR), synthetic polyisoprene rubber, epoxylated natural rubber, polybutadiene rubber, nitrile-hydrogenated butadiene rubber NHBR, hydrogenated styrene-butadiene rubber HSBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

14. The tire composition of claim 1, wherein the tire composition has a reduction in rolling resistance expressed as tan δ at 60° C. of at least 3% less the tan δ at 60° C. of a composition with an equal amount of uncoated silica particulates and resin, as separate components.

15. The tire composition of claim 1, wherein the tire composition has an increase in wet grip resistance expressed as tan δ at 0° C. of at least 5% more than the tan δ at 0° C. of a composition with an equal amount of uncoated silica particulates and resin, as separate components.

16. The tire composition of claim 1, wherein the tire composition has a rolling resistance expressed as tan δ at 60° C. of less than 0.20 and a tan δ at 0° C. of at least 0.50.

17. The tire composition of claim 1, wherein the tire composition has DIN abrasion relative volume loss of less than 150 mm$^3$.

18. The composition of claim 1, further comprising a second resin in an amount of up to 50 phr, wherein the second resin is the same or different from the resin, and wherein the second resin is selected from the group consisting of:
a coumarone-indene resin consisting of coumarone and indene repeat units,
a petroleum hydrocarbon resin, consisting of petroleum hydrocarbon repeat units, and optionally, aliphatic olefin units, phenol units, or cresol units;
a terpene-based resin selected from the group consisting of a polyterpene resin and a terpene phenol resin, wherein the polyterpene resin consists of terpene repeat units; and the terpene phenol resin consists of terpene and phenol repeat units;
a styrene-alpha-methylstyrene resin consisting of styrene and alpha-methylstyrene repeat units,
rosin derived resins and copolymers; and
mixtures thereof.

19. A composition comprising a resin-covered silica having an average primary particle size of <1000 μm,
wherein the resin-covered silica is formed in a process consisting essentially of coating finely divided silica with a composition consisting essentially of a resin to coat at least a surface of the finely divided silica forming the resin-covered silica as separate silica particles coated with the first resin,
wherein the resin is not chemically bonded to the finely divided silica, and
wherein the resin is selected from the group consisting of
a coumarone-indene resin consisting of coumarone and indene repeat units,
a petroleum hydrocarbon resin; consisting of petroleum hydrocarbon repeat units, and optionally, aliphatic olefin units, phenol units, or cresol units;
a terpene-based resin selected from the group consisting of a polyterpene resin and a terpene phenol resin, wherein the polyterpene resin consists of terpene repeat units; and the terpene phenol resin consists of terpene and phenol repeat units;
a styrene-alpha-methylstyrene resins consisting of styrene and alpha-methylstyrene repeat units,
rosin derived resins and copolymers;
mixtures thereof.

20. A method for preparing a resin-covered silica, comprising the steps:
providing finely divided silica core having an average primary particle size of <1000 μm;
providing a dispersion comprising a resin;
mixing the finely divided silica core with the dispersion to form a mixture, wherein at least a surface of the finely divided silica core is coated with the resin;
drying the mixture to form the resin-covered silica; and
wherein the resin-covered silica has an average primary particle size difference of less than 10% as compared to average primary particle size of the finely divided silica;
wherein the resin is not chemically bonded to the finely divided silica, and
wherein the resin is selected from the group consisting of:
a coumarone-indene resin consisting of coumarone and indene repeat units; a petroleum hydrocarbon resin consisting of petroleum hydrocarbon repeat units, and optionally, aliphatic olefin units, phenol units, or cresol units; a terpene-based resin selected from the group consisting of a polyterpene resin and a terpene phenol resin, wherein the polyterpene resin consists of terpene repeat units; and the terpene phenol resin consists of terpene and phenol repeat units; a styrene-alpha-methylstyrene resin consisting of styrene and alpha-methyl styrene repeat units, rosin derived resins and copolymers, and mixtures thereof.

* * * * *